US006008632A

United States Patent [19]

Sasaki

[11] Patent Number: 6,008,632

[45] Date of Patent: Dec. 28, 1999

[54] CONSTANT-CURRENT POWER SUPPLY CIRCUIT AND DIGITAL/ANALOG CONVERTER USING THE SAME

[75] Inventor: Seiichiro Sasaki, Tokyo, Japan

[73] Assignee: Oki Electric Industry Co., Ltd., Tokyo, Japan

[21] Appl. No.: 09/170,103

[22] Filed: Oct. 13, 1998

[30] Foreign Application Priority Data

Oct. 15, 1997 [JP] Japan .............................. HO9-282399

[51] Int. Cl.[6] .............................. G05F 3/16; G02B 5/128

[52] U.S. Cl. .......................... 323/313; 323/314; 327/538; 327/544

[58] Field of Search .................................... 323/313, 314, 323/315, 316; 327/538, 540, 541, 543, 544, 546

[56] References Cited

U.S. PATENT DOCUMENTS

| | | | |
|---|---|---|---|
| 4,492,914 | 1/1985 | Hitomi | 323/313 |
| 5,266,887 | 11/1993 | Smith | 323/316 |
| 5,510,750 | 4/1996 | Cho | 327/546 |
| 5,519,309 | 5/1996 | Smith | 323/316 |
| 5,525,897 | 6/1996 | Smith | 323/315 |
| 5,559,425 | 9/1996 | Allman | 323/315 |
| 5,705,921 | 1/1998 | Xu | 323/315 |
| 5,838,192 | 11/1998 | Bowers et al. | 327/541 |

FOREIGN PATENT DOCUMENTS

| | | | |
|---|---|---|---|
| 63-265315 | 11/1988 | Japan | G05F 3/24 |

*Primary Examiner*—Peter S. Wong
*Assistant Examiner*—Bao Q. Vu
*Attorney, Agent, or Firm*—Rabin & Champagne, P.C.

[57] ABSTRACT

A constant-current power supply circuit includes a bias circuit (20); first and second transistors (11 and 12); an output terminal (OUT); a bias voltage defining circuit (30 & 40); and a compensator (50 or 60). The bias circuit (20) generates a first bias voltage (Vb1). The first transistor (11) supplies a first current ($I_1$) in response to the first bias voltage (Vb1), supplied from the bias circuit (20). The first current is outputted from an output terminal (OUT). The second transistor (12) is connected between the first transistor (11) and the output terminal (OUT) and is operated in response to a second bias voltage (Vb2). The bias voltage defining circuit (30 & 40) defines the second bias voltage (Vb2). The compensator (50 or 60) is connected to the bias defining circuit (30 & 40) to perform temperature compensation.

20 Claims, 7 Drawing Sheets

CONSTANT-CURRENT POWER SUPPLY CIRCUIT AND DIGITAL/ANALOG CONVERTER USING THE SAME

CROSS REFERENCE TO RELATED APPLICATION

This application claims the priority of Application No. H09-282399, filed Oct. 15, 1997 in Japan, the subject matter of which is incorporated herein by reference.

TECHNICAL FIELD OF THE INVENTION

The present invention relates to a constant-current power supply circuit, which is connected between a power supply line and a load and which supplies constant-current to the load. The invention also relates to a digital/analog converter circuit (hereafter referred to as a DAC) which makes use of the constant-current power supply circuit.

BACKGROUND OF THE INVENTION

A constant-current power supply is capable of maintaining a preset current through a variable load resistance. A conventional constant-current power supply circuit is described in Japanese Laying Open S63-265315. The reference discloses plural constant-current power supply circuits connected to a common power supply line. Each constant-current power supply circuit is provided with P-channel field effect transistors (hereafter referred to as PMOS) and N-channel effect transistors (hereafter referred to as NMOS). Sources of PMOS and NMOS are mutually connected, while the drain of the NMOS being connected to the power supply line which supplies the power voltage. It is constructed to output constant current (constant current) from the drain of the PMOS.

Each NMOS gate is supplied with common bias power generated by a bias circuit based on the power voltage, and each of the PMOS gates is supplied with bias voltage generated by the bias circuit based on the power voltage, independently from each PMOS.

As stated in the above reference, the NMOS, installed between the PMOS and the power supply line, corrects any power voltage variation generated by the power supply line resistance in each constant-current power supply circuit. Therefore, variation of the constant-current output supplied from each constant-current power supply circuit is eliminated.

According the above-described conventional constant-current power supply circuit, however, the bias voltage supplied to the NMOS and PMOS varies due to temperature variations in the power voltage source. Therefore, the constant current output supplied from the PMOS will also vary in response to the temperature.

OBJECTS OF THE INVENTION

Accordingly, an object of the invention is to provide a constant-current power supply circuit that outputs constant current precisely independent from temperature variation.

Another object of the invention is to provide a digital/analog converter using a constant-current power supply circuit precisely supplying constant current independent from temperature variation.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the invention, a constant-current power supply circuit includes a bias circuit (20); first and second transistors (11 and 12); an output terminal (OUT); a bias voltage defining circuit (30 & 40); and a compensator (50 or 60). The bias circuit (20) generates a first bias voltage (Vb1). The first transistor (11) supplies a first current ($I_1$) in response to the first bias voltage (Vb1), supplied from the bias circuit (20). The first current is outputted from an output terminal (OUT). The second transistor (12) is connected between the first transistor (11) and the output terminal (OUT) and is operated in response to a second bias voltage (Vb2). The bias voltage defining circuit (30 & 40) defines the second bias voltage (Vb2). The compensator (50 or 60) is connected to the bias defining circuit (30 & 40) to perform temperature compensation.

According to a second aspect of the invention, a digital/analog converter includes a decoder (71, 72); a constant-current power supply unit (80); a switch circuit (82); and a voltage converter (73). The decoder (71, 72) decodes an input signal composed of plural pieces of digital data to generate a plurality of data signals. The constant-current power supply unit (80) supplies a constant current in response to the data signal supplied from the decoder (71, 72). The constant-current power supply unit (80) is designed based on the same concept of the above-described first aspect of the invention. The switch circuit (82) selects at least one signal from output signals supplied from the constant-current power supply circuit (80). The voltage converter (73) combines the selected signal(s) supplied through the switch circuit (82) to generate an output voltage signal corresponding to the input signal.

In the above-mentioned constant-current power supply circuit, according to the invention, the first transistor (11) passes the first current ($I_1$) based on the first bias voltage (Vb1). On the other hand, the second bias voltage (Vb2), supplied to the second transistor (12), is defined by the bias voltage defining circuit (30, 40) and the compensator (50, 60). Given the second bias voltage (Vb2), the second transistor masks variation of voltage at the output terminal (OUT). Therefore, the first current ($I_1$) supplied from the first transistor (11) is outputted via the second transistor (12) to the output terminal (OUT).

The compensator prevents the second bias voltage (Vb2) from changing due to temperature variation, and also reduces the temperature properties of the constant current, outputted from the output terminal (OUT). In other words, the second transistor (12) masks voltage change at the output terminal (OUT), so that the drain-source voltage of the first transistor (11) is kept constant, and a stable constant current $I_1$ can be obtained.

DETAILED DISCLOSURE OF THE INVENTION (1) First Preferred Embodiment

Figure 1:
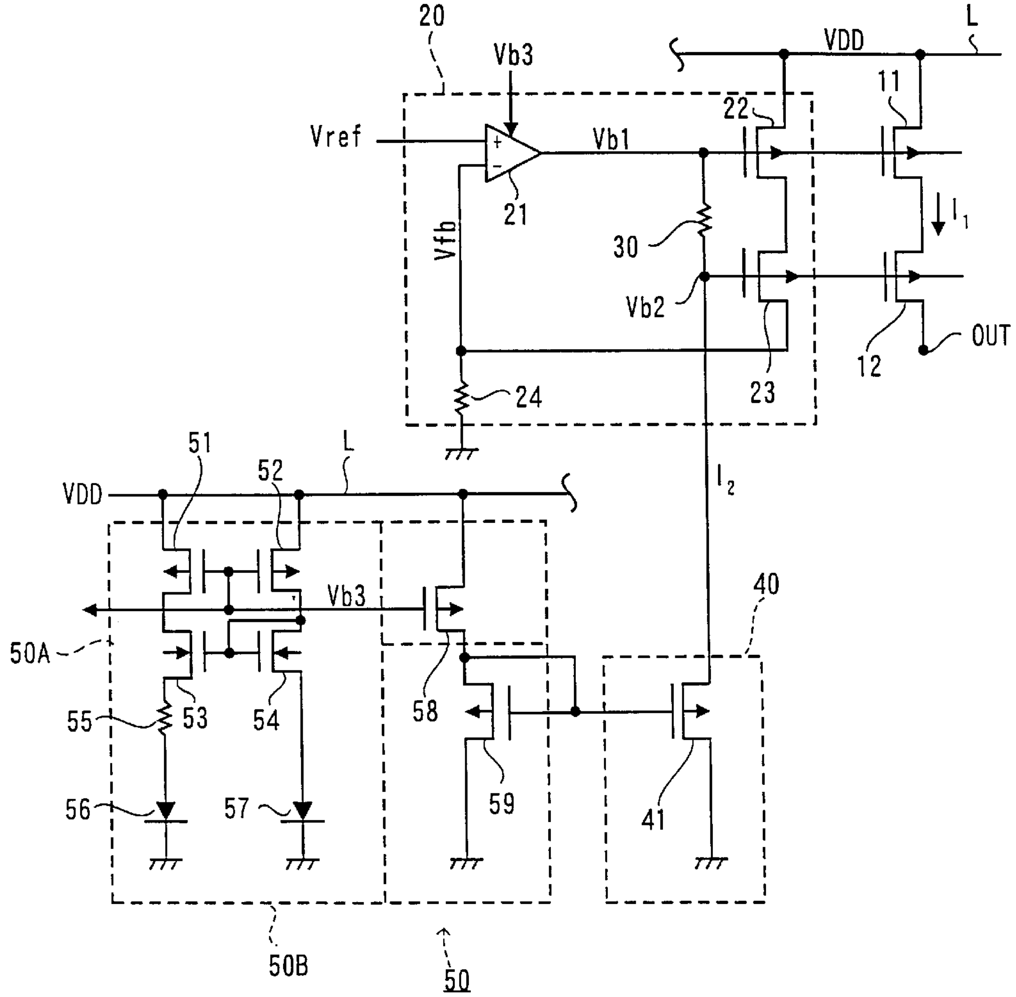
FIG. 1 is a circuit diagram showing a constant-current power supply circuit, according to a first preferred embodiment of the invention.

FIG. 1 shows a constant-current power supply circuit, according to a first preferred embodiment of the invention. The constant-current power supply circuit includes a PMOS 11, PMOS 12, and a bias circuit 20. The PMOS 11, corresponding to a first transistor in the claims, supplies a first current $I_1$. The PMOS 11 is connected at a source to a power supply line L, which supplies power voltage VDD. The PMOS 12, corresponding to a second transistor in the claims, is cascade-connected to the PMOS 11.

The source of the PMOS 12 is connected to the drain of the PMOS 11. The drain of the PMOS 12 is connected to an output terminal OUT. Conductance "gm" of the PMOS 12 is set to be larger than that of the PMOS 11 by changing the transistor size and the concentration of impurities. The gate of the PMOS 11, which is a control electrode, is supplied with a first bias voltage Vb1 from the bias circuit 20.

The bias circuit 20 includes an operational amplifier 21, a PMOS 22, and a PMOS 23. The operational amplifier 21 generates the first bias voltage Vb1 by amplifying the difference between a reference voltage Vref and a feedback voltage Vfb. The PMOS 22, corresponding to a first dummy transistor in the claims, supplies dummy current that is equivalent to the first current I1, outputted from the PMOS 11. The PMOS 23, corresponding to a second dummy transistor in the claims, has the same properties as the PMOS 12. The source of the PMOS 22 is connected to the power supply line L. The drain of the PMOS 22 is connected to the source of the PMOS 23. The operational amplifier 21 is connected at an output terminal to the gate of the PMOS 22. A resistor 24 is connected between the drain of the PMOS 23 and the ground. The resistor 24, corresponding to a first resistor in the claims, produces the feedback voltage Vfb based on the output current of the PMOS 22, supplied via the PMOS 23.

The bias circuit 20 includes a bias-defining resistor 30, which defines a second bias voltage Vb2. The bias defining resistor 30 is connected at one end to the gates of the PMOSs 11 and 22, and at the other end to the gates of the PMOSs 12 and 23.

The constant-current power supply circuit also includes a bias voltage control circuit 40, and a compensator 50. The bias voltage control circuit 40 operates to supply a second constant current $I_2$ to the bias-defining resistor 30. The compensator 50 compensates the temperature of the second constant current $I_2$ flowing through the bias-defining resistor 30.

The bias voltage control circuit 40 includes a PMOS 41, connected at a source to the connection point between the gate of PMOS 23 (PMOS 12) and the bias-defining resistor 30. The PMOS 41 corresponds to the bias control transistor in the claims. The drain of the PMOS 41 is connected to the ground to supply the second constant current $I_2$. The compensator 50 includes a bias voltage generator 50A, a third transistor PMOS 58, and a converter circuit 50B. The bias voltage generator 50A generates a third bias voltage Vb3, which is to be supplied to the gate of the PMOS 58 and also to the operational amplifier 21.

The bias voltage generator 50A includes PMOSs 51 and 52 each of whose sources is connected to the power supply line L. The PMOS 51 is connected at a drain to the gates of PMOSs 51 and 52 and also to the drain of an NMOS 53. The drain of the PMOS 52 is connected to the gate of the NMOS 53 and also to the drain and gate of an NMOS 54. The source of the NMOS 53 is connected to the ground through a load resistor 55 and a diode 56. The diode 56 operates as a temperature compensation element. The source of the NMOS 54 is connected to the ground via a diode 57, which operates as a temperature compensation element as well.

The source of the PMOS 58 is connected to the power supply line L. The gate of the PMOS 58 is connected to the drain of the PMOS 51 in the bias voltage generator 50A. The source of the PMOS 58 is connected to the gate and drain of a PMOS 59 in the converter circuit 50B and also to the gate of the PMOS 41 in the bias voltage control circuit 40. The source of the PMOS 59 is connected to the ground.

Next, the operation of the above-described constant-current power supply circuit will be described.

The bias circuit 20 reverse-amplifies the difference between the feedback voltage Vfb and the reference voltage Vref, and outputs the first bias voltage Vb1. The feedback voltage Vfb is generated by the PMOSs 22 and 23 and the resistor 24, and is negatively fed back to be constant. The first bias voltage Vb1 is supplied to each gate of the PMOSs 11 and 22.

When the power voltage VDD is provided from the power supply line L, the bias voltage generator 50A generates the third bias voltage Vb3 to have a level defined based on the power voltage VDD. Electric current flows through a circuit formed by the PMOS 52, NMOS 54 and diode 57. Another electric current corresponding to the current flowing the circuit (52, 54 and 57) also flows in a circuit formed by the PMOS 51, NMOS 53, load resistor 55, and the diode 56. When current flows through the load resistor 55 and the diode 56, the drain voltage of the PMOS 51 is defined and is outputted as the third bias voltage Vb3. In this instance, even if the power voltage VDD or the load resistor 55 changes due to temperature variation, the third bias voltage Vb3 will not change because the voltage Vb3 is temperature-compensated by the diodes 56 and 57.

When the third bias voltage Vb3 is supplied to the gate of the PMOS 58 in the converter circuit 50B, the PMOS 58 is turned on, and the PMOS 58 sets the PMOS 59 to on state. Then, the PMOS 58 in the on state outputs a control current to the ground via the PMOS 59. This control current is generated based on the third bias voltage Vb3, so that the drain voltage of the PMOS 58 will not depend on the temperature, either. The drain voltage of the PMOS 58 is applied to the gate of the PMOS 41 in the form of a control signal.

The PMOS 41 supplies the constant current $I_2$, which is temperature-independent, to the ground via the power supply line L and the bias defining resistor 30. When the constant current $I_2$ flowing through the bias defining resistor 30, the second bias voltage Vb2 for the gates of the PMOSs 12 and 23 is set to be lower than the first bias voltage Vb1 by the amount of voltage-drop at the bias defining resistor 30.

In response to the second bias voltage Vb2, the PMOS 12 becomes conductive to pass the constant current $I_1$ supplied from the PMOS 11 to the output terminal OUT. The second bias voltage Vb2 supplied to the gate of the PMOS 12 is constant. Hence, the drain voltage of the PMOS 11 becomes Vb2+Vth, where "Vth" is the threshold value of the PMOS 12. The drain-source voltage of the PMOS 11 does not change even if the voltage of the output terminal OUT changes. Therefore, the output current $I_1$ of the PMOS 11 becomes constant.

Figure 2:
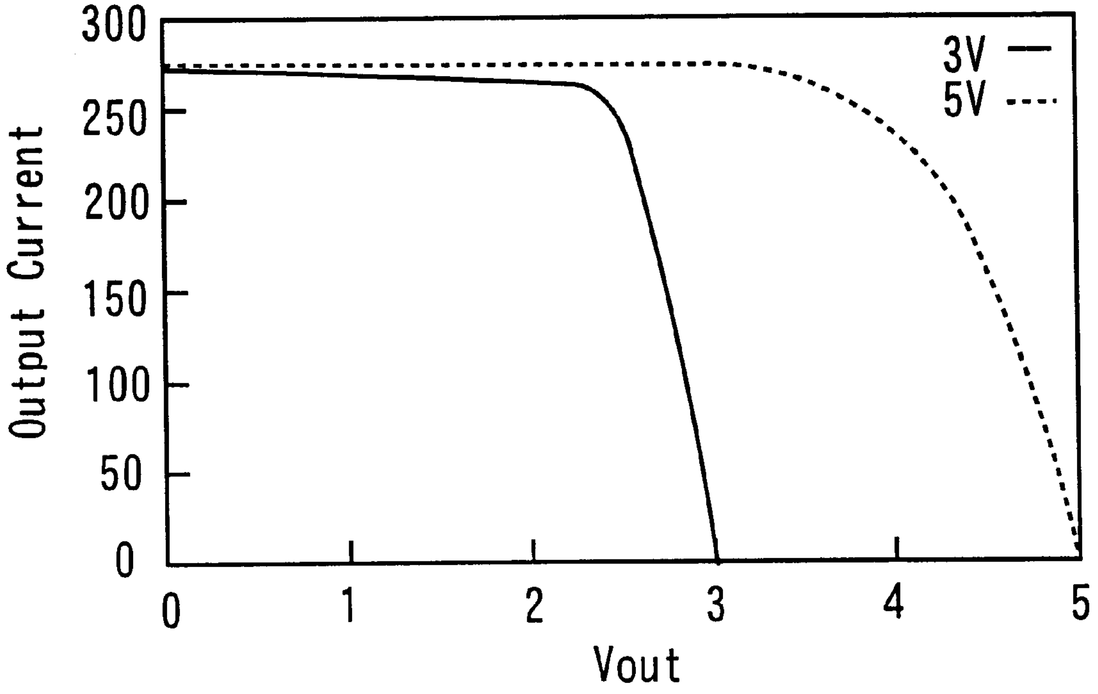
FIG. 2 is a graph showing variation of output current relative to output voltages in the first preferred embodiment.

As described above, in the first preferred embodiment, the PMOS 12 is connected between the drain of the PMOS 11 and the output terminal OUT, and the bias defining resistor 30, the bias voltage control circuit 40, and the compensator 50 are also installed, thereby obtaining the following advantages:

FIG. 2 shows the output current characteristic of the constant-current power supply circuit, according to the first preferred embodiment. It is assumed that a load resistor, which converts the first current $I_1$ into a voltage, is connected to the output terminal OUT, and the output voltage Vout up to 1.3 V is outputted. In this case, changing the current $I_1$ can change the full scale of the output voltage Vout. The current $I_1$ is changed in response to change of the resistance of the first resistor 24. If there is no PMOS 12, for example, and the power voltage VDD is set to 5 V, the current $I_1$ will have a characteristic property curve relative to the output voltage Vout shown in a broken line in FIG. 2. The curve keeps almost a constant current value until the output voltage Vout becomes 1.3 V.

However, if the power voltage VDD is set to 3 V, the characteristic of the current $I_1$ degrades. Therefore, the output voltage Vout, which should change linearly in response to the load resistance (integral linearity) comes to behave nonlinearly. This is because the drain voltage of the PMOS 11 became corresponding to the voltage at the output terminal OUT and the drain-source voltage of the PMOS 11 is decreased.

In the first preferred embodiment, the PMOS 12 is installed, the drain-source voltage of the PMOS 11 is maintained constant, and a satisfactory integral linearity is obtained. As a result, the power voltage VDD can be reduced.

The second bias voltage Vb2, supplied to the gate of the PMOS12, is not easily influenced by the temperature change of the power voltage VDD, because the circuit includes the bias-defining resistor 30, the bias voltage control circuit 40, and the compensator 50. As a result, the temperature properties of the output current $I_1$ can be reduced.

The PMOS 12 makes the drain voltage of the PMOS 11 constant, so that a desirable amount of the output current $I_1$ can be obtained even if the load resistance connected to the output terminal OUT or the resistance value of the first resistor 24 is changed.

(2) Second Preferred Embodiment

Figure 3:
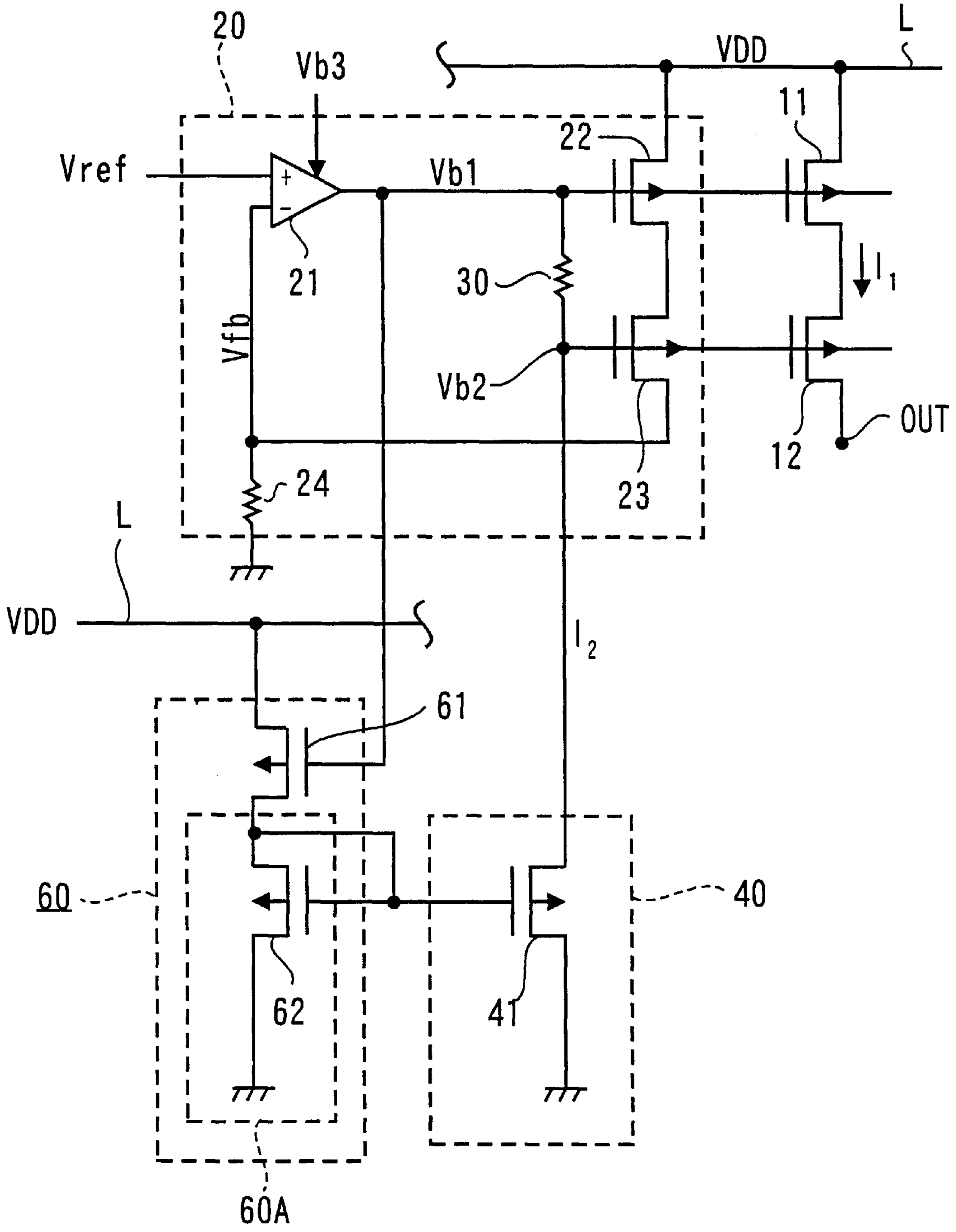
FIG. 3 is a circuit diagram showing a constant-current power supply circuit, according to a second preferred embodiment of the invention.

FIG. 3 shows a constant-current power supply circuit, according to a second preferred embodiment of the invention. In this embodiment, the same and corresponding elements to those in the first preferred embodiment, shown in FIG. 1, are indicated by the same symbols. In the second preferred embodiment, a compensator 60 is used in place of the compensator 50 in the first preferred embodiment.

The compensator 60 includes a fourth transistor PMOS 61 and another PMOS 62. The PMOS 61 is connected at a source to the power supply line L and at a gate to an output terminal of the operational amplifier 21. The PMOS 62 is connected at a source to the drain of the PMOS 61 and constitutes a converter 60A. The drain of the PMOS 61 is further connected to the gate of the PMOS 62, and is also connected to the gate of the PMOS 41 in the bias voltage control circuit 40. The drain of the PMOS 62 is connected to the ground. The PMOS 61 works as a current mirror of the PMOS 22, and the gate length of the PMOS 61 is formed to be longer than the gate length of the PMOS 22.

The feedback voltage Vfb is generated by the PMOSs 22 and 23, and the first resistor 24 and is negatively fed back. Reverse amplification is performed in response to the difference between the feedback voltage Vfb and the reference voltage Vref to generate the first bias voltage Vb1. The first bias voltage Vb1 has a constant value independent from temperature by negative feedback of the feedback voltage Vfb. The first bias voltage Vb1 is supplied to each gate of the PMOSs 11 and 22 and al to the gate of the PMOS 61.

When the first bias voltage Vb1 is applied to the gate of the PMOS 61, the PMOS 61 gets in the conductive state, and outputs a drain voltage as a control signal to the gates of PMOS 62 and PMOS 41. When the PMOS 41 gets in the conductive state, the second constant current $I_2$ corresponding to the control current flows through the bias defining resistor 30. At the same time, the gate voltage of PMOS 12 and 23 is defined. The PMOSs 11 and 12 operate in the same manner as the first preferred embodiment, shown in FIG. 1, and the constant current $I_1$ is outputted from the output terminal OUT.

Figure 4A:
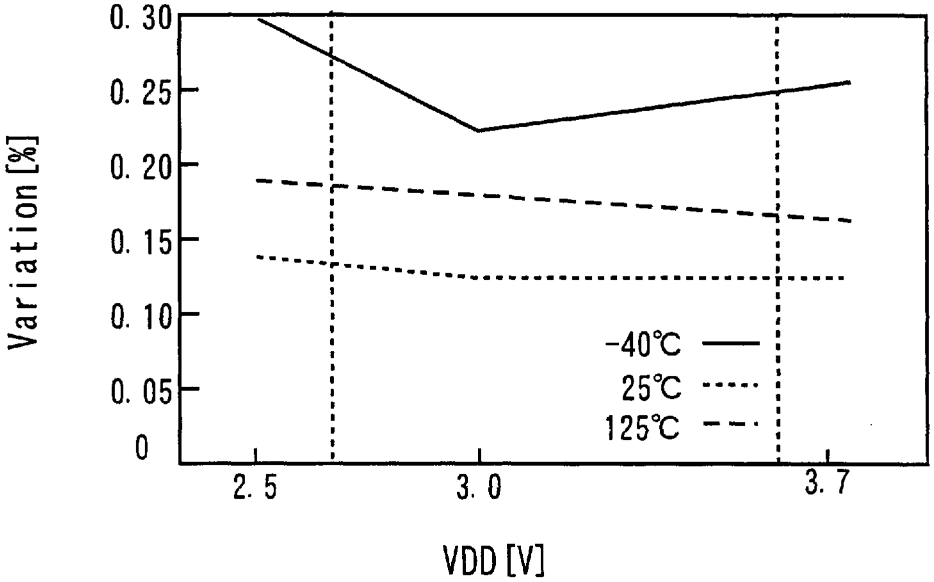
FIGS. 4A and 4B are graphs showing the rate of output voltage change under different temperatures relative to the power voltage VDD.
Figure 4B:
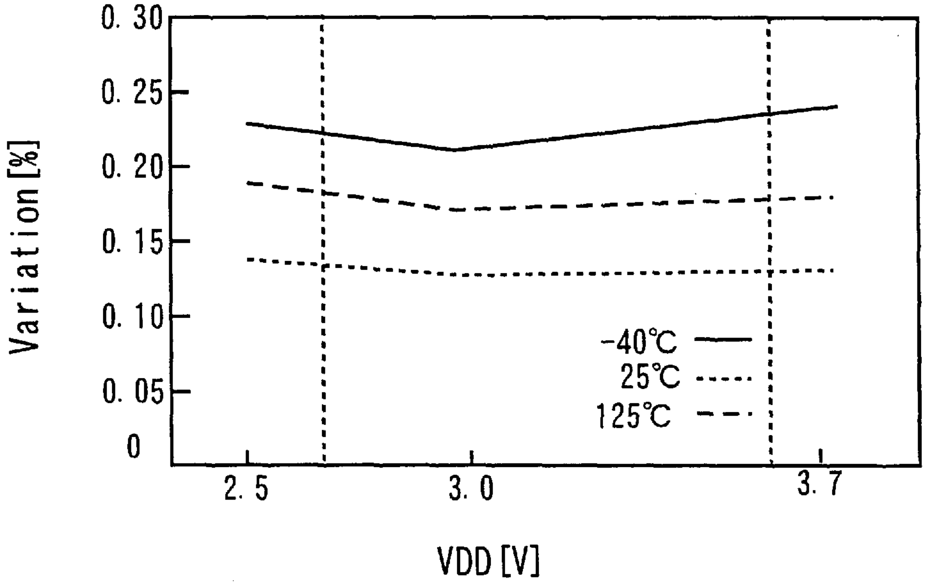

Now, the advantages of the constant-current power supply circuit, according to the second preferred embodiment, shown in FIG. 3, are explained by referring to FIGS. 4A and 4B.

In the first preferred embodiment, the bias defining resistor 30 and the current flowing through it have positive temperature properties, therefore, the voltage between the gates of the PMOSs 11 and 12 may be too small when the surrounding temperature is low. As a result, if the output terminal OUT is connected to a load so as to convert the first current $I_1$ into the output voltage Vout, the output voltage Vout is influenced by the current $I_2$ and changes according to the temperature.

In FIGS. 4A and 4B, the deviation of the output voltage Vout from linearity (integral linearity) is measured as the amount of change when the power voltage VDD is fixed and the output voltage Vout is changed from 0 V to 1.3 V. FIG. 4A shows the measurement results according to the first preferred embodiment, while FIG. 4B shows the measurement results according to the second preferred embodiment. As shown in FIG. 4A, when the power voltage VDD is set to near 2.5 V and near 3.7 V, the amount of change at −40° C. becomes large. On the other hand, as shown in FIG. 4B, the amount of change at −40° C. is small in the second preferred embodiment.

In the second preferred embodiment, the first bias voltage Vb1 is generated by the negative feedback loop of the operational amplifier 21, PMOS 22 and 23, and the first resistor 24. The first bias voltage Vb1 is applied to the gate of the PMOS 61 which forms the compensator 60. Therefore, even if the bias-defining resistor 30 changes due to a change in temperature, the gate voltage of PMOS 12 never becomes too low, because the constant current $I_2$ flows through the bias-defining resistor 30 to compensate the changes thereof.

As a result, the constant current $I_1$ can be generated with high accuracy. Furthermore, because the gate length of the PMOS 61 is set to be longer than that of the PMOS 22, the current flowing through the PMOS 61 is reduced. Therefore, even if the first resistor 24 or the load resistor connected to the output terminal OUT is changed, the influence on the current $I_2$ is small, allowing a wider range of the changes of resistance.

(3) Third Preferred Embodiment

Figure 5:
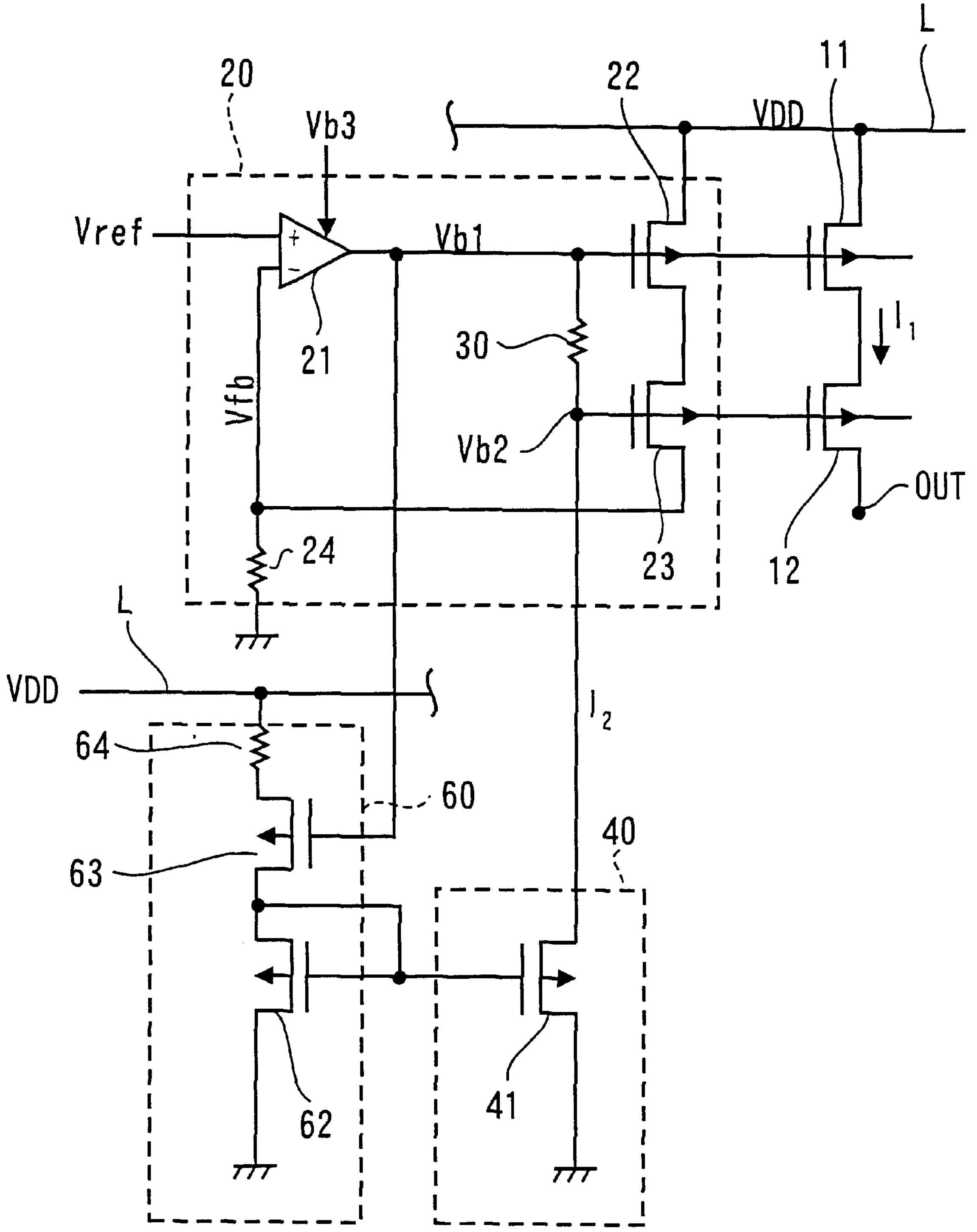
FIG. 5 is a circuit diagram showing a constant-current power supply circuit, according to a third preferred embodiment of the invention.

FIG. 5 shows a constant-current power supply circuit, according to a third preferred embodiment of the invention. In this embodiment, the same and corresponding elements to those in the first and second preferred embodiments, shown in FIGS. 1 and 3, are indicated by the same symbols. In the third preferred embodiment, a PMOS 63 is used in the compensator 60 instead of the PMOS 61 in the second preferred embodiment, and a resistor 64 is provided.

The PMOS 63 has the same gate length as that of the PMOS 22 and is constructed so that the first bias voltage Vb1 is inputted to the gate of the PMOS 63 and the same current as the PMOSs 11 and 22 is outputted therefrom. The source of the PMOS 63 is connected to the power supply line L, and the drain is connected to the source of the PMOS 62.

The basic operation of the third preferred embodiment is the same as that of the second preferred embodiment. However, the resistor 64 reduces the current flowing in the PMOSs 63 and 62. Therefore, even if the resistor 24 or the load resistor connected to the output terminal OUT is changed, the influence on the current $I_2$ is small, allowing a wider range of changes of resistance.

(4) Fourth Preferred Embodiment

Figure 6:
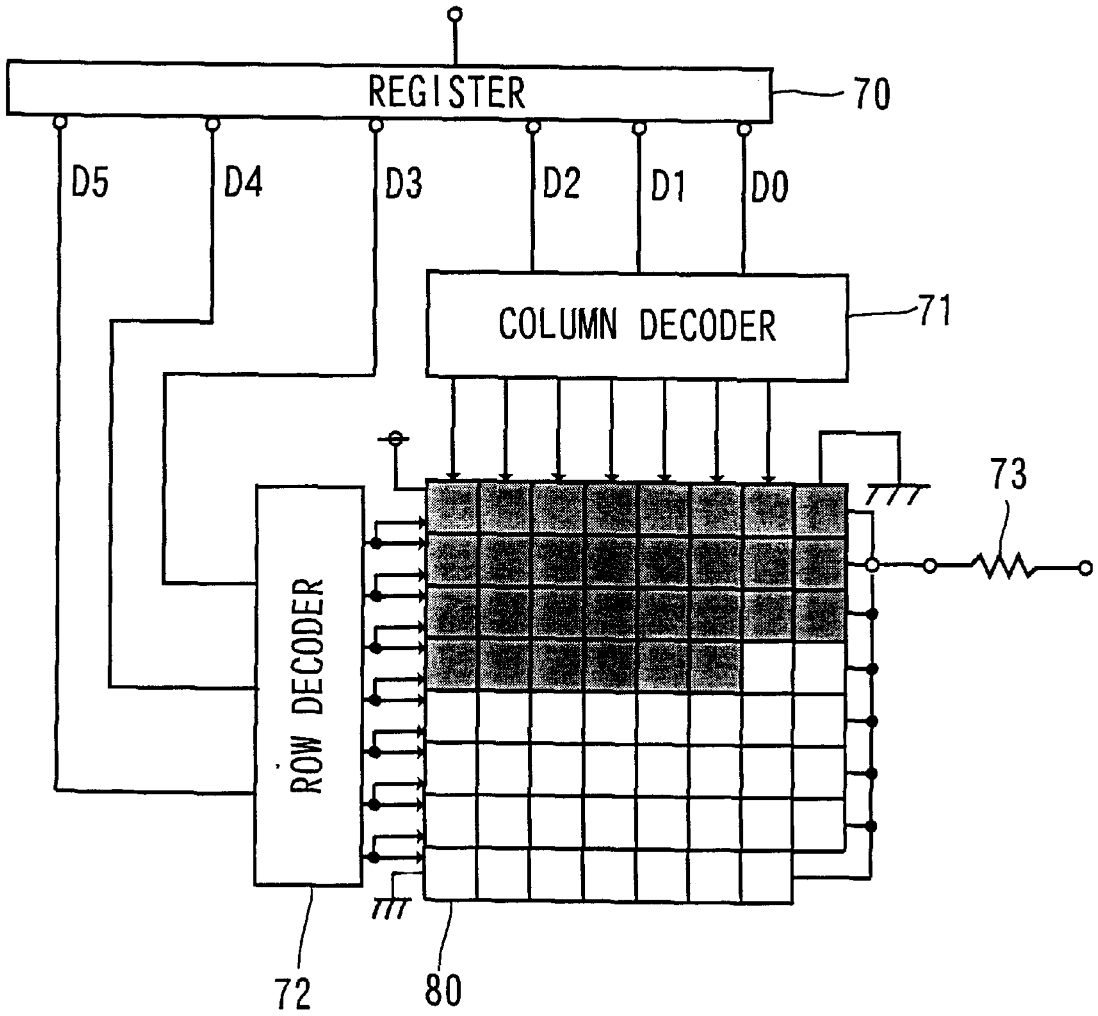
FIG. 6 shows a digital/analog converter according to a fourth preferred embodiment of the invention.

FIG. 6 shows a DAC (Digital/Analog Converter) according to a fourth preferred embodiment of the present invention. The DAC includes a register 70, which receives and stores input signal consisting of 6-bit digital data D0~D5. The DAC further includes two decoders (column decoder and row decoder) 71 and 72 connected to the output terminals of the register 70. The DAC further includes a constant-current power supply unit, and a resistor 73, which is provided with a voltage conversion element.

The register 70 outputs the lower 3 bits of the input signal to the decoder 71 in parallel and the upper 3 bits to the decoder 72 in parallel as well. Each of the decoders 71 and 72 outputs the decoding results in parallel to the constant-current power supply unit 80.

Figure 7:
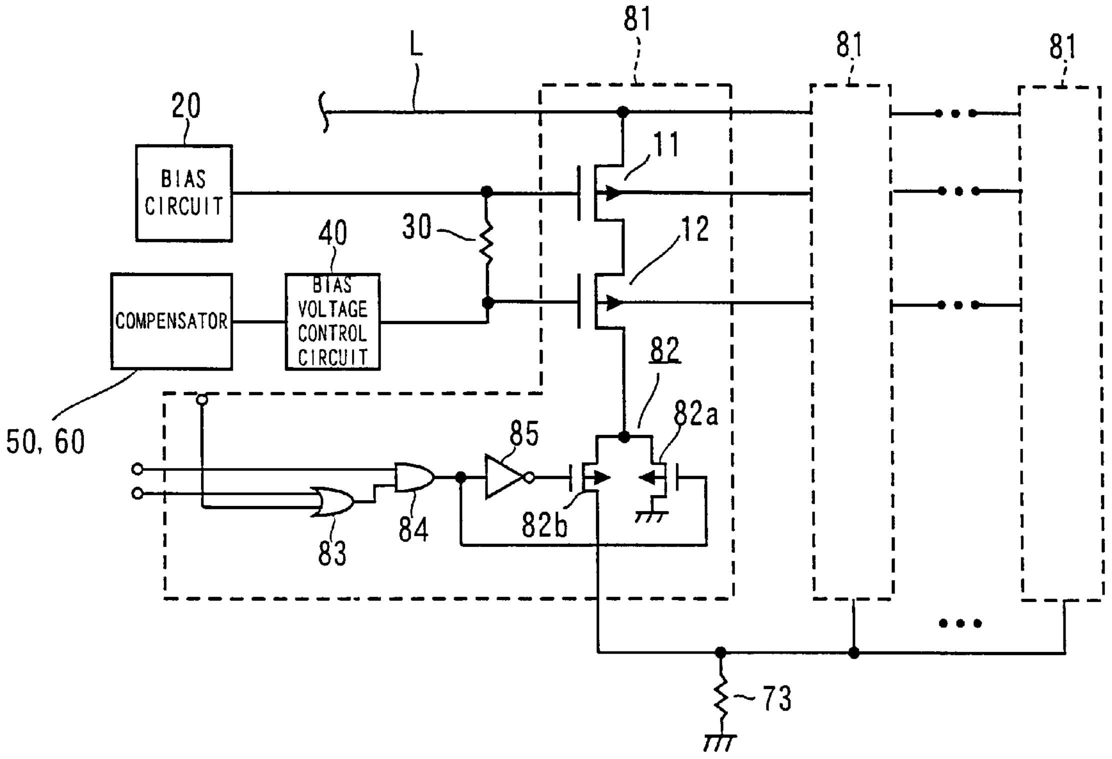
FIG. 7 is a circuit diagram showing a constant-current power supply circuit used in FIG. 6.

FIG. 7 shows the construction of the constant-current power supply unit 80, shown in FIG. 6. The constant-current power supply unit 80 includes a bias circuit 20, a bias defining resistor 30, a bias voltage control circuit 40, a compensator 50 or 60, a plurality of current generators 81 and a resistor 73. Each current generator 81 includes a PMOS 11, a PMOS 12, a switch circuit 82, gates 83 and 84, and an inverter 85. The PMOS 11 is connected at a source to a power supply line L and outputs a first current $I_1$. The PMOS 12 is connected at a source to the drain of the PMOS 11.

In each current generator 81, a common bias voltage (first bias voltage) Vb1 is supplied to the gate of the PMOS 11, and a common bias voltage (second bias voltage) Vb2, generated by the bias-defining resistor 30, is supplied to the gate of the PMOS 12.

The switch circuit 82 includes PMOSs 82*a* and 82*b*, each source of which is connected to the drain of the PMOS 12. In each current generator 81, the drain of the PMOS 82*a* is connected to the ground. All the drains of the PMOSs 82*b* are connected to the resistor 73. In each current generator 81, the gates 83 and 84 generate a logical data based on data signals supplied from the decoders 71 and 72. The logical data supplied from the gate 84 is supplied to the gate of the PMOS 82*a*. The logical data is inverted by the inverter 85 and is supplied to the gate of the PMOS 82*b*. The current generators 81 are arranged in matrix.

The operation of the DAC, shown in FIG. 6, is now described. The register 70 stores serial input signals and outputs them in parallel to the decoders 71 and 72. The decoder 71 receives the input data D0~D2, decodes the data D0~D2, and outputs in parallel the decoding results to the constant-current power supply unit 80. The decoder 72 receives the input data D3~D5, decodes the data D3~D5, and outputs in parallel the decoding results to the constant-current power supply unit 80.

The first constant current $I_1$ is generated by the current generators 81, the bias circuit 20, the bias defining resistor 30, the bias voltage control circuit 40 and the compensator 50 or 60, in the same manner as the first to third preferred embodiments. Each current generator 81 outputs the constant current $I_1$ in the manner described before in the first to third preferred embodiments.

In each current generator 81, the gates 83 and 84 generate a logic data corresponding to the data supplied from the decoders 71 and 72. Based on this logic data, one of the PMOS 82*a* and 82*b* becomes on state, and the other becomes off state. From current generators 81 where the PMOS 82*b* is in on state, the constant current $I_1$ is outputted. All the constant current $I_1$ supplied from the current generators 81 where PMOS 82*b* is in on state are combined and supplied to the resistor 73. The resistor 73 outputs an analog voltage signal corresponding to the combined input current.

As described above, in the fourth preferred embodiment, the gates of the PMOSs 11 and 12 are connected to each other via the bias defining resistor 30 in each current generator 81. The gate voltage of each PMOS 11 and 12 is defined by the compensator 50/60 and the bias voltage control circuit 40. Therefore, as explained in the first to third preferred embodiments, the constant current $I_1$ of high accuracy and small temperature dependency can be obtained, and the precision of the output voltage can be improved. Especially, a DAC with a superior integral linearity can be realized. Furthermore, the power voltage VDD can be reduced.

The present invention is not limited to the above embodiments and various transformations are applicable as follows, for example:

(1) If the polarity of the ground and the power voltage VDD are reversed, the PMOSs 11, 12, 22, 23, 51, 52, 58, 59, 41, etc. would be changed to NMOSs. Also, bipolar type of transistors can be used to obtain the similar advantage and effects.

(2) Although the PMOS 41 is connected between the bias defining resistor 30 and the ground, it can be connected between the power supply line L and the bias defining resistor 30.

As described above, according to the invention, it is possible to realize a high-precision current source circuit where there is a change in the influence of the output terminal voltage or temperature. In addition, it is possible to realize a high-precision current source circuit which is superior in terms of integral linearity and which is little influenced by temperature change.

What is claimed is:

1. A constant-current power supply circuit, comprising:

a bias circuit which generates a first bias voltage;

a first transistor which supplies a first current in response to the first bias voltage, supplied from the bias circuit;

an output terminal from which the first current is supplied as an output current;

a second transistor which is connected between the first transistor and the output terminal and is operated in response to a second bias voltage;

a bias voltage defining circuit which defines the second bias voltage; and a compensator which is connected to the bias defining circuit to perform temperature compensation.

2. The constant-current power supply circuit, according to claim 1, wherein said first transistor comprises a first electrode connected to a power supply line, a control electrode applied with the first bias voltage, and a second electrode, from which the first current is supplied; and said second transistor comprises a first electrode connected to the second electrode of the first transistor, a second electrode connected to the output terminal and a control electrode to be applied with the second bias voltage.

3. The constant-current power supply circuit, according to claim 1, wherein said bias voltage defining circuit comprises:

(A) a bias defining resistor connected between the control electrodes of the first and second transistors; and (B) a bias voltage control circuit which supplies a second current to the bias defining resistor to control the second bias voltage.

4. The constant-current power supply circuit, according to claim 3, wherein the bias voltage control circuit is designed to allow the second voltage flow through the bias defining resistor to the ground.

5. The constant-current power supply circuit, according to claim 4, wherein said bias voltage control circuit comprises a bias control transistor of which a first electrode is connected to the bias defining resistor, a second electrode is connected to the ground and a control electrode is connected to the compensator.

6. The constant-current power supply circuit, according to claim 1, wherein said bias circuit comprises:

(A) a first dummy transistor which generates a dummy current, corresponding to the first current, in response to the first bias voltage;

(B) a second dummy transistor which is applied with the second bias voltage;

(C) a first resistor connected between the ground and the second dummy transistor to convert the dummy current, supplied through the second dummy transistor from the first dummy transistor, to generate a feedback voltage; and (D) an amplifier which amplifies the difference between a reference voltage and the feedback voltage to generate the first bias voltage.

7. The constant-current power supply circuit, according to claim 6, wherein said first dummy transistor comprises a first electrode connected to the power supply line, a control electrode to which the first bias voltage is applied; and a second electrode from which the dummy current corresponding to the first current is supplied;

said second dummy transistor comprises a first electrode connected to the second electrode of the first dummy transistor, a second electrode and a control electrode, to which the second bias voltage is applied; and said first resistor is connected between the ground and the second electrode of the second dummy transistor.

8. The constant-current power supply circuit, according to claim 1, wherein said compensator comprises:

(A) a bias voltage generator which generates a third bias voltage;

(B) a third transistor which generates a control current in response to the third bias voltage; and (C) a converter circuit which converts the control current supplied from the third transistor into a control voltage to be applied to the bias voltage control circuit.

9. The constant-current power supply circuit, according to claim 8, wherein said bias voltage generator comprises a load resistor connected between the ground and the power supply line; and a temperature compensation element, wherein the third bias voltage is defined by the resistance of the load resistor; and said third transistor comprises a first electrode connected to the power supply line; a second electrode from which the control current is supplied; and a control electrode connected to the load resistor.

10. The constant-current power supply circuit, according to claim 9, wherein in said voltage generator, the temperature compensation element comprises a first diode connected between the load resistor and the ground; and a second diode connected to the ground.

11. The constant-current power supply circuit, according to claim 1, wherein said compensator comprises:

(A) a fourth transistor which operates as a current mirror to the first dummy transistor; and (B) a converter circuit which generates a control signal based on an output current of the fourth transistor and supplies the control signal to the bias voltage control circuit.

12. The constant-current power supply circuit, according to claim 11, wherein the first dummy transistor and the fourth transistor are of the same polarity of MOS (Metal Oxide Semiconductor) transistors, in which the fourth transistor has a longer gate length than that of the first dummy transistor.

13. The constant-current power supply circuit, according to claim 11, wherein said fourth transistor is provided at a first or second electrode with a resistor, which reduce the amount of current flowing through the fourth transistor.

14. A constant-current power supply circuit, comprising:

a first transistor comprising a first electrode connected to a power supply line, a control electrode, to which a first bias voltage is applied and a second electrode, from which a first current is supplied;

an output terminal from which the first current is supplied as an output current;

a second transistor which comprises a first electrode connected to the second electrode of the first transistor, a second electrode connected to the output terminal and a control electrode applied with a second bias voltage;

a bias circuit which generates the first bias voltage and comprises:

(A) a first dummy transistor which generates a dummy current, corresponding to the first current, in response to the first bias voltage;

(B) a second dummy transistor which is applied with the second bias voltage;

(C) a first resistor connected between the ground and the second dummy transistor to convert the dummy current, supplied through the second dummy transistor from the first dummy transistor, to generate a feedback voltage; and (D) an amplifier which amplifies the difference between a reference voltage and the feedback voltage to generate the first bias voltage;

a bias voltage defining circuit which defines the second bias voltage and comprises:

(A) a bias defining resistor connected between control electrodes of the first and second transistors; and (B) a bias voltage control circuit which supplies a second current to the bias defining resistor to control the second bias voltage; and a compensator which is connected to the bias voltage control circuit to perform temperature compensation.

15. The constant-current power supply circuit, according to claim 14, wherein said compensator comprises:

(A) a bias voltage generator which generates a third bias voltage;

(B) a third transistor which generates a control current in response to the third bias voltage; and (C) a converter circuit which converts the control current supplied from the third transistor into a control voltage to be applied to the bias voltage control circuit.

16. The constant-current power supply circuit, according to claim 15, wherein said bias voltage generator comprises a load resistor connected between the ground and the power supply line; and a temperature compensation element, wherein the third bias voltage is defined by the resistance of the load resistor; and said third transistor comprises a first electrode connected to the power supply line; a second electrode from which the control current is supplied; and a control electrode connected to the load resistor.

17. The constant-current power supply circuit, according to claim 16, wherein in said voltage generator, the temperature compensation element comprises a first diode connected between the load resistor and the ground; and a second diode connected to the ground.

18. The constant-current power supply circuit, according to claim 14, wherein said compensator comprises:

(A) a fourth transistor which operates as a current mirror to the first dummy transistor; and (B) a converter circuit which generates a control signal based on an output current of the fourth transistor and supplies the control signal to the bias voltage control circuit.

19. The constant-current power supply circuit, according to claim 18, wherein the first dummy transistor and the fourth transistor are of the same polarity of MOS (Metal Oxide Semiconductor) transistors, in which the fourth transistor has a longer gate length than that of the first dummy transistor.

20. The constant-current power supply circuit, according to claim 18, wherein said fourth transistor is provided at a first or second electrode with a resistor, which reduce the amount of current flowing through the fourth transistor.

* * * * *